US010949209B2

(12) United States Patent
Li et al.

(10) Patent No.: US 10,949,209 B2
(45) Date of Patent: Mar. 16, 2021

(54) TECHNIQUES FOR SCHEDULING INSTRUCTIONS IN COMPILING SOURCE CODE

(71) Applicant: Microsoft Technology Licensing, LLC, Redmond, WA (US)

(72) Inventors: Xiang Li, Bellevue, WA (US); Michael Alan Dougherty, Issaquah, WA (US); David McCarthy Peixotto, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/237,012

(22) Filed: Dec. 31, 2018

(65) Prior Publication Data
US 2020/0210194 A1    Jul. 2, 2020

(51) Int. Cl.
*G06F 9/44* (2018.01)
*G06F 9/38* (2018.01)
*G06F 8/41* (2018.01)
*G06N 5/00* (2006.01)

(52) U.S. Cl.
CPC ............ *G06F 9/3836* (2013.01); *G06F 8/443* (2013.01); *G06N 5/003* (2013.01)

(58) Field of Classification Search
None
See application file for complete search history.

(56) References Cited

U.S. PATENT DOCUMENTS 5,778,233 A * 7/1998 Besaw .................... G06F 8/443
717/146
2017/0371653 A1* 12/2017 Gottlieb .............. G06F 15/8007

OTHER PUBLICATIONS

"International Search Report & Written Opinion issued in PCT Application No. PCT/US2019/066678", dated Mar. 31, 2020, 10 Pages.
Russell, et al., "Learning Heuristics for the Superblock Instruction Scheduling Problem", In Journal of IEEE Transactions on Knowledge and Data Engineering, vol. 21, Issue 10, Oct. 2009, pp. 1489-1502.

* cited by examiner

*Primary Examiner* — Qamrun Nahar
(74) *Attorney, Agent, or Firm* — Arent Fox LLP

(57) ABSTRACT

Examples described herein generally relate to generating, from a listing of source code, a plurality of basic blocks for compiling into intermediate language, determining, for a first basic block of the plurality of basic blocks, first heuristics related to applying a first plurality of optimizations to the first basic block, determining, for a second basic block of the plurality of basic blocks, second heuristics related to applying a second plurality of optimizations to the second basic block, and applying, based on the first heuristics and the second heuristics, one of the first plurality of optimizations to the first basic block to schedule first instructions for the first basic block and one of the second plurality of optimizations to the second basic block to schedule second instructions for the second basic block.

20 Claims, 4 Drawing Sheets

TECHNIQUES FOR SCHEDULING INSTRUCTIONS IN COMPILING SOURCE CODE

BACKGROUND

Use of computing devices is becoming more ubiquitous by the day. Computing devices range from standard desktop computers to gaming systems to wearable computing technology and beyond. Programming languages can be used to develop software for computing devices, and typically provide an environment for drafting source code instructions. The source code instructions are compiled, using a compiler, into an intermediate language that can be understood by a computing device operating system or processor for performing instructions based on the source code. In compiling the source code, the compiler can group intermediate language instructions representative of the source code into basic blocks of instructions that are executed in sequence without a branch. When the compiler encounters a branch statement in the source code, such as a loop, a conditional clause, function or procedure call, etc., the compiler can generate another basic block of instructions for that branch, and so on until all of the source code is compiled. The basic blocks of instructions for the program can then be scheduled within the intermediate language to generate the compiled software code, which can be executed on the computing device operating system or processor.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for scheduling instructions in compiling source code is provided. The method includes generating, from a listing of source code, a plurality of basic blocks for compiling into intermediate language, determining, for a first basic block of the plurality of basic blocks, first heuristics related to applying a first plurality of optimizations to the first basic block, determining, for a second basic block of the plurality of basic blocks, second heuristics related to applying a second plurality of optimizations to the second basic block, and applying, based on the first heuristics and the second heuristics, one of the first plurality of optimizations to the first basic block to schedule first instructions for the first basic block and one of the second plurality of optimizations to the second basic block to schedule second instructions for the second basic block.

In another example, a computing device for scheduling instructions in compiling source code is provided. The apparatus includes a memory storing one or more parameters or instructions for compiling source code, and at least one processor coupled to the memory. The at least one processor is configured to generate, from a listing of source code, a plurality of basic blocks for compiling into intermediate language, determine, for a first basic block of the plurality of basic blocks, first heuristics related to applying a first plurality of optimizations to the first basic block, determine, for a second basic block of the plurality of basic blocks, second heuristics related to applying a second plurality of optimizations to the second basic block, and apply, based on the first heuristics and the second heuristics, one of the first plurality of optimizations to the first basic block to schedule first instructions for the first basic block and one of the second plurality of optimizations to the second basic block to schedule second instructions for the second basic block.

In another example, a non-transitory computer-readable medium, including code executable by one or more processors for scheduling instructions in compiling source code is provided. The code includes code for generating, from a listing of source code, a plurality of basic blocks for compiling into intermediate language, determining, for a first basic block of the plurality of basic blocks, first heuristics related to applying a first plurality of optimizations to the first basic block, determining, for a second basic block of the plurality of basic blocks, second heuristics related to applying a second plurality of optimizations to the second basic block, and applying, based on the first heuristics and the second heuristics, one of the first plurality of optimizations to the first basic block to schedule first instructions for the first basic block and one of the second plurality of optimizations to the second basic block to schedule second instructions for the second basic block.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to optimizing scheduling of instructions in compiling source code. In an example, a compiler can generate multiple basic blocks of instructions in an intermediate language, where each basic block can include a collection of intermediate language instructions that correspond to a sequence of source code instructions without a branch. For each basic block of intermediate language instructions, the compiler can determine a set of heuristics corresponding to each of multiple possible optimizations that can be performed for the given basic block to schedule the corresponding instructions within the basic block. For example, the set of heuristics can correspond to estimated performance metrics for the instruction scheduling based on the given optimization for the basic block. Based on the set of heuristics, the compiler can schedule the instruction sequence within each basic block.

Some compilers may offer optimizations achieved through instruction scheduling, however, a given optimization is applied over all basic blocks of instructions for a software application. In accordance with examples described herein, optimizations can be evaluated and applied for each of multiple basic blocks for the software application to arrive at a more optimized software application. For example, with the heuristics determined for each of the multiple basic blocks, the heuristics for all basic blocks (or at least a subset of multiple basic blocks) can be considered together (e.g., added) to determine combination of heuristics results in the most desirable overall heuristics, which may be for a given optimization for the overall software application or otherwise. The corresponding optimizations for the determined heuristics per basic block can be applied to schedule instruction sequence for the basic block to achieve the overall optimization in compiling the source code for the software application.

Figure 1:
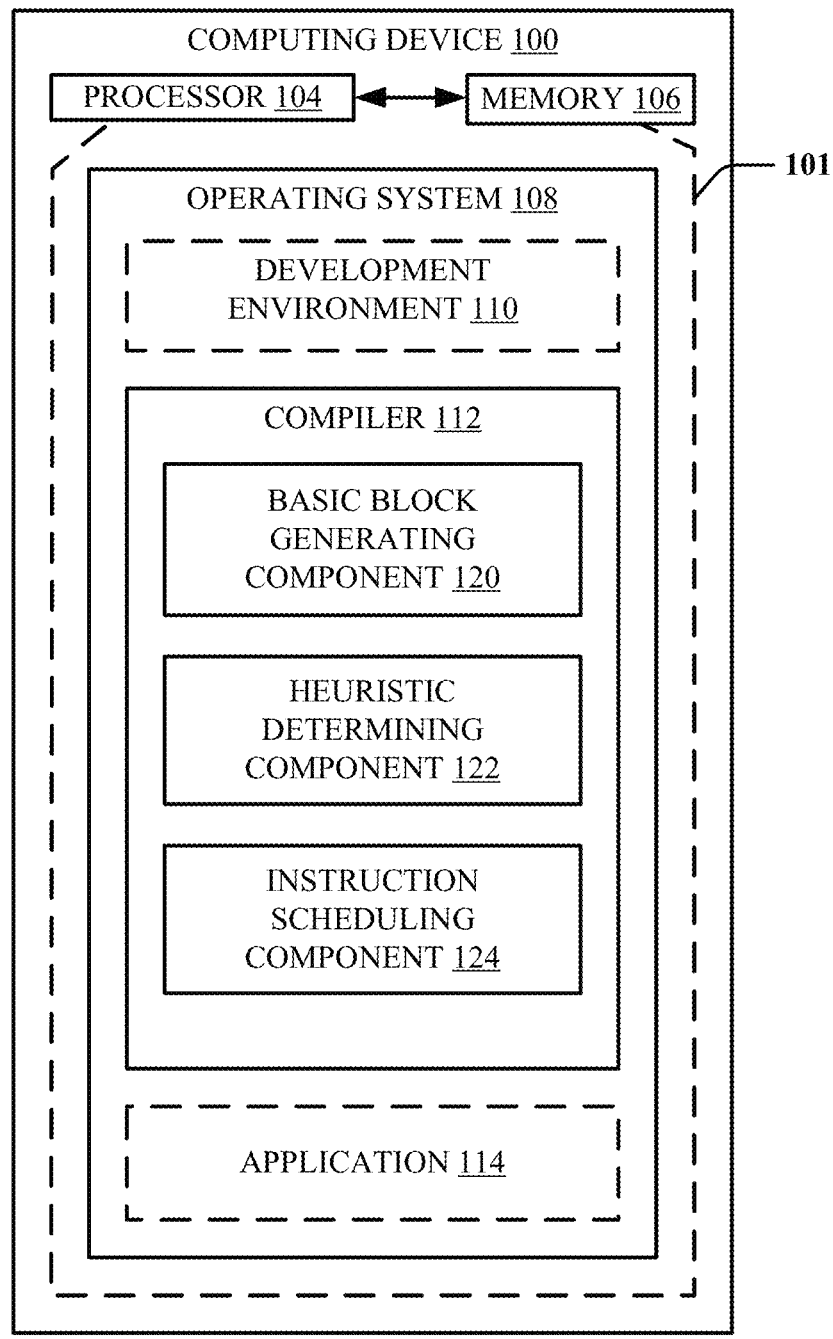
FIG. 1 is a schematic diagram of an example of a computing device for compiling source code in accordance with examples described herein.
Figure 2:
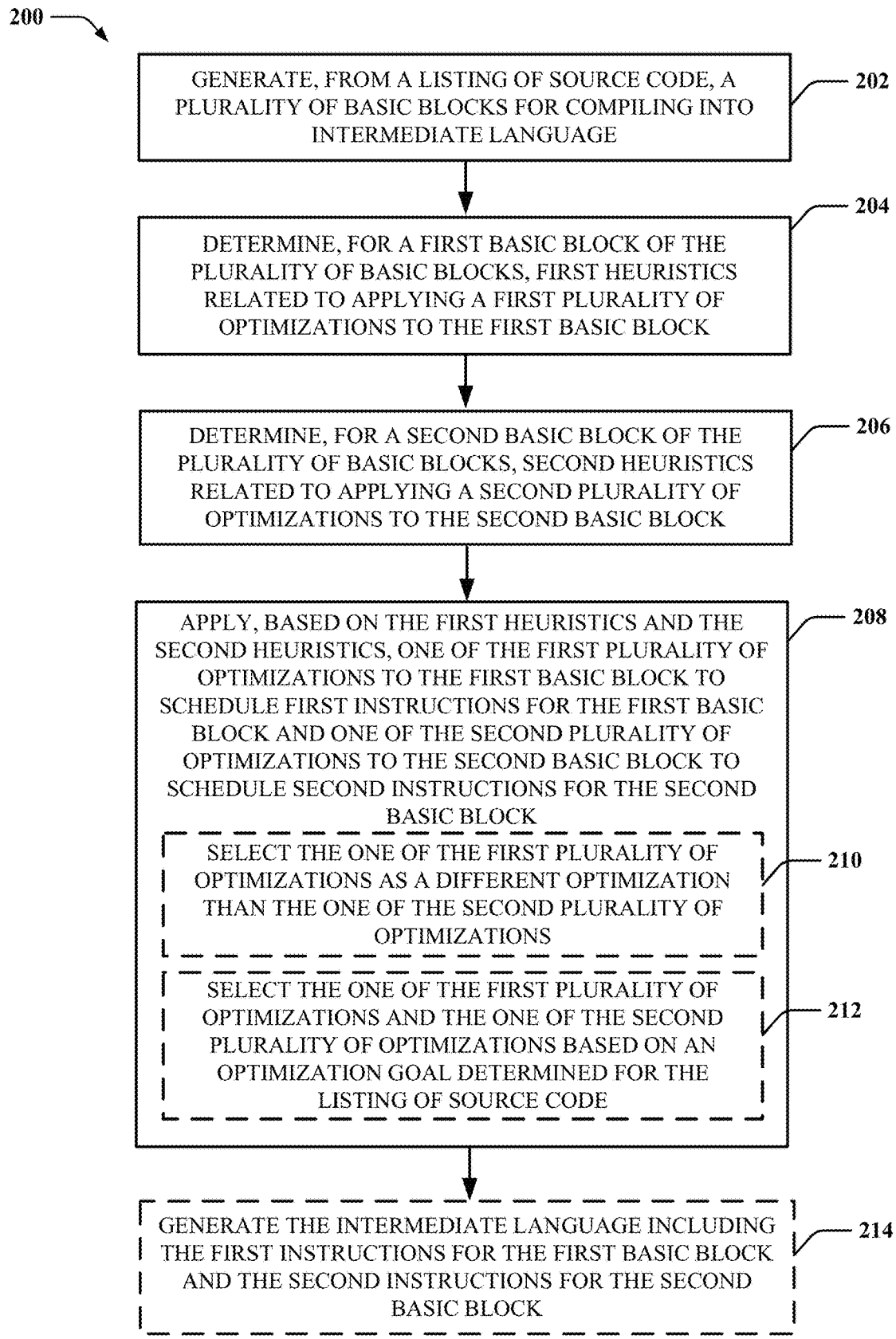
FIG. 2 is a flow diagram of an example of selecting instructions for optimizing compiling of source code in accordance with examples described herein.

Turning now to FIGS. 1-4, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for scheduling instructions in compiling source code in accordance with aspects described herein. For example, computing device 100 can include or can otherwise be coupled with a processor 104 and/or memory 106, where the processor 104 and/or memory 106 can be configured to execute or store instructions or other parameters related to associating interaction data with media content, as described herein. For example, processor 104 and memory 106 may be separate components communicatively coupled by a bus (e.g., on a motherboard or other portion of a computing device, on an integrated circuit, such as a system on a chip (SoC), etc.), components integrated within one another (e.g., processor 104 can include the memory 106 as an on-board component 101), and/or the like. Memory 106 may store instructions, parameters, data structures, etc., for use/execution by processor 104 to perform functions described herein.

In an example, computing device 100 can execute an operating system 108 (e.g., via processor 104 and/or memory 106) for providing an environment for executing one or more applications, such as an optional development environment 110 for providing an interface to facilitate source code development, a compiler 112 for compiling source code generated using development environment 110 or otherwise received at the computing device 100, and/or an optional application 114 that is generated from intermediate language compiled based on the source code, where the application can execute via operating system 108 and/or on other computing devices via other operating systems (not shown).

Compiler 112 can include a basic block generating component 120 for generating, from a listing of source code, basic blocks of intermediate language instructions. For example, the source code can include text drafted in a programming language according to a specified syntax, where the compiler 112 can interpret the source code and generate corresponding machine language understood by the processor 104 and/or operating system 108 (or by a processor 104 and/or operating system 108 of another device, where compiler 112 can execute on computing device to generate software applications for other types of devices). Accordingly, basic block generating component 120 can generate the basic blocks of machine language instructions from the source code using an interpreter that can process the programming language of the source code.

As described, each basic block can be a collection of machine language instructions generated without branching, e.g., machine language that corresponds to source code within a branch. The source code without the branch may include a sequential listing of the source code that does not refer or jump to a different source code location, such as source code within a loop, conditional clause, function or procedure call, etc. For each branch, basic block generating component 120 can generate a new basic block of machine language instructions until a next branch, and so on until the source code is compiled into multiple basic blocks of the machine language instructions. The machine language can then be used to create the application 114 for executing on the processor 104 and/or operating system 108 (or another processor 14 and/or operating system 108, as described above).

Compiler 112 also includes a heuristic determining component 122 for determining heuristics associated with applying optimizations to each of the basic blocks generated from the source code. For example, heuristic determining component 122 can determine the heuristics as one or more performance metrics related to applying one of multiple possible optimizations to the basic blocks to schedule corresponding machine language instructions. Compiler 112 may also include an instruction scheduling component 124 for scheduling machine language instructions within the basic blocks (e.g., scheduling the sequence of instructions within the basic blocks) based on determining which of the optimizations for a given basic block results in a most optimal optimization for all basic blocks (or at least a subset of multiple basic blocks).

FIG. 2 is a flowchart of an example of a method 200 for scheduling instructions in compiling source code. For example, method 200 can be performed by the computing device 100, and is accordingly described with reference to FIG. 1, as a non-limiting example of an environment for carrying out method 200.

In method 200, at action 202, a plurality of basic blocks for compiling into intermediate language can be generated from a listing of source code. In an example, basic block generating component 120, e.g., in conjunction with processor 104, memory 106, operating system 108, compiler 112, etc., can generate, from the listing of source code, the plurality of basic blocks for compiling into the intermediate language. For example, the listing of source code may be received from development environment 110 as source code written by an application developer using an interface of the development environment 110. In another example, the source code can be received from another application or computing device. The source code can include one or more files having a listing of commands in a syntax of a programming language. The compiler 112 can obtain the listing and can parse the listing of the source code using an interpreter. The basic block generating component 120 can generate one or more basic blocks from the source code, as described, by converting programming language syntax into machine language instructions, and may generate each basic block as a sequence of instructions corresponding to source code until a branch is reached, at which time basic block generating component 120 can generate another basic block, and so on.

In method 200, at action 204, first heuristics related to applying a first plurality of optimizations to the first basic block can be determined for the first basic block. In an example, heuristic determining component 122, e.g., in conjunction with processor 104, memory 106, operating system 108, compiler 112, etc., can determine, for the first basic block, the first heuristics related to applying the first plurality of optimizations to the first basic block. For example, heuristic determining component 122 can determine the first heuristics to include at least one heuristic for each possible optimization of the first basic block. For example, the optimizations can relate to reducing register pressure (e.g., reducing a number of registers required to execute the machine language corresponding to the basic block), reducing latency associated with executing the machine language of the basic block, reducing a size of the machine language for the basic block, and/or the like. In this example, the heuristics can accordingly include a register pressure metric (e.g., a number or percentage of registers used) for each possible optimization, a latency metric for each possible optimization, a code size for each possible optimization, etc. In an example, compiler 112 can end up applying different optimizations, in this regard, in scheduling machine language instructions corresponding to the source code such to achieve the selected optimization, as described further herein.

In method 200, at action 206, second heuristics related to applying a second plurality of optimizations to the second basic block can be determined for the second basic block. In an example, heuristic determining component 122, e.g., in conjunction with processor 104, memory 106, operating system 108, compiler 112, etc., can determine, for the second basic block, the second heuristics related to applying the second plurality of optimizations to the second basic block. For example, heuristic determining component 122 can determine the second heuristics to include at least one heuristic for each possible optimization of the second basic block. For example, heuristic determining component 122 can determine the first and second heuristics based on the same set of possible optimizations, or a different set of possible optimizations.

In addition, heuristic determining component 122 can determine heuristics for additional basic blocks and/or all basic blocks for the listing of source code. Thus, in an example, heuristic determining component 122 may generate a table of basic blocks and possible optimizations, where the values in the table can correspond to the heuristics for each possible optimization for each basic block in the table.

In this example, the heuristics can be evaluated together to determine which optimization to apply to each basic block to achieve a certain optimization of the machine language. In method 200, at action 208, based on the first heuristics and the second heuristics, one of the first plurality of optimizations can be applied to the first basic block to schedule first instructions for the first basic block and one of the second plurality of optimizations can be applied to the second basic block to schedule second instructions for the basic block. In an example, instruction scheduling component 124, e.g., in conjunction with processor 104, memory 106, operating system 108, compiler 112, etc., can apply, based on the first heuristics and the second heuristics, one of the first plurality of optimizations to the first basic block to schedule the first instructions for the first basic block and one of the second plurality of optimizations to the second basic block to schedule second instructions for the second basic block. As described, scheduling the instructions, in this regard, can refer to scheduling the sequence of the instructions to be executed within each given basic block, where the sequence of the instructions is scheduled to achieve the corresponding optimization. Thus, for example, the instruction scheduling component 124 can schedule the first instructions by generate a sequence of the first instructions that achieve the one of the first plurality of optimizations. In addition, for example, the instruction scheduling component 124 can schedule the second instructions by generate a sequence of the second instructions that achieve the one of the second plurality of optimizations.

In one example, instruction scheduling component 124 can analyze the first heuristics and second heuristics together (e.g., and/or with other heuristics for other basic blocks) to determine a combination of optimizations to apply to each basic block. In one specific example, instruction scheduling component 124 can sum the heuristics for each basic block for each corresponding optimization to determine which optimization for which specific basic block results in the most desirable heuristics for all basic blocks (e.g., a lowest register pressure, lowest latency, lowest code size, etc.). For example, the different optimizations applied to each basic block may result in better overall optimization of the source code for one or more purposes.

In an example, in applying the optimizations to the basic blocks at action 208, optionally at action 210, the one of the first plurality of optimizations can be selected as a different optimization than the one of the second plurality of optimizations. In an example, instruction scheduling component 124, e.g., in conjunction with processor 104, memory 106, operating system 108, compiler 112, etc., can select the one of the first plurality of optimizations as a different optimization than the one of the second plurality of optimizations. As described, for example, instruction scheduling component 124 can apply the first optimization related to reducing register pressure to the first basic block and may apply the second optimization related to reducing latency to the second basic block to achieve an overall optimization for the listing of source code.

In another example, in applying the optimizations to the basic blocks at action 208, optionally at action 212, the one of the first plurality of optimizations and the one of the second plurality of optimizations can be selected based on an optimization goal determined for the listing of source code. In an example, instruction scheduling component 124, e.g., in conjunction with processor 104, memory 106, operating system 108, compiler 112, etc., can select the one of the first plurality of optimizations and the one of the second plurality of optimizations based on an optimization goal determined for the listing of source code. As described, the overall optimization goal for the source code may be different from that selected for a given basic block, and selecting different optimizations for each basic block may allow for better achieving the overall goal. Thus, instruction scheduling component 124 can determine which combination of optimizations for each basic block allow for achieving the overall optimization goal, and can accordingly select the optimizations for generating or reordering scheduled instructions for the basic blocks.

In method 200, optionally at action 214, the intermediate language can be generating including the first instructions for the first basic block and the second instructions for the second basic block. In an example, compiler 112, e.g., in conjunction with processor 104, memory 106, operating system 108, etc., can generate the intermediate language including the first instructions for the first basic block and the second instructions for the second basic block. In this regard, instruction scheduling component 124 can apply the optimizations to each basic block to generate a sequence of scheduled instructions to achieve the optimizations, and compiler 112 can combine the basic blocks into intermediate language for executing the corresponding software application.

Figure 3:
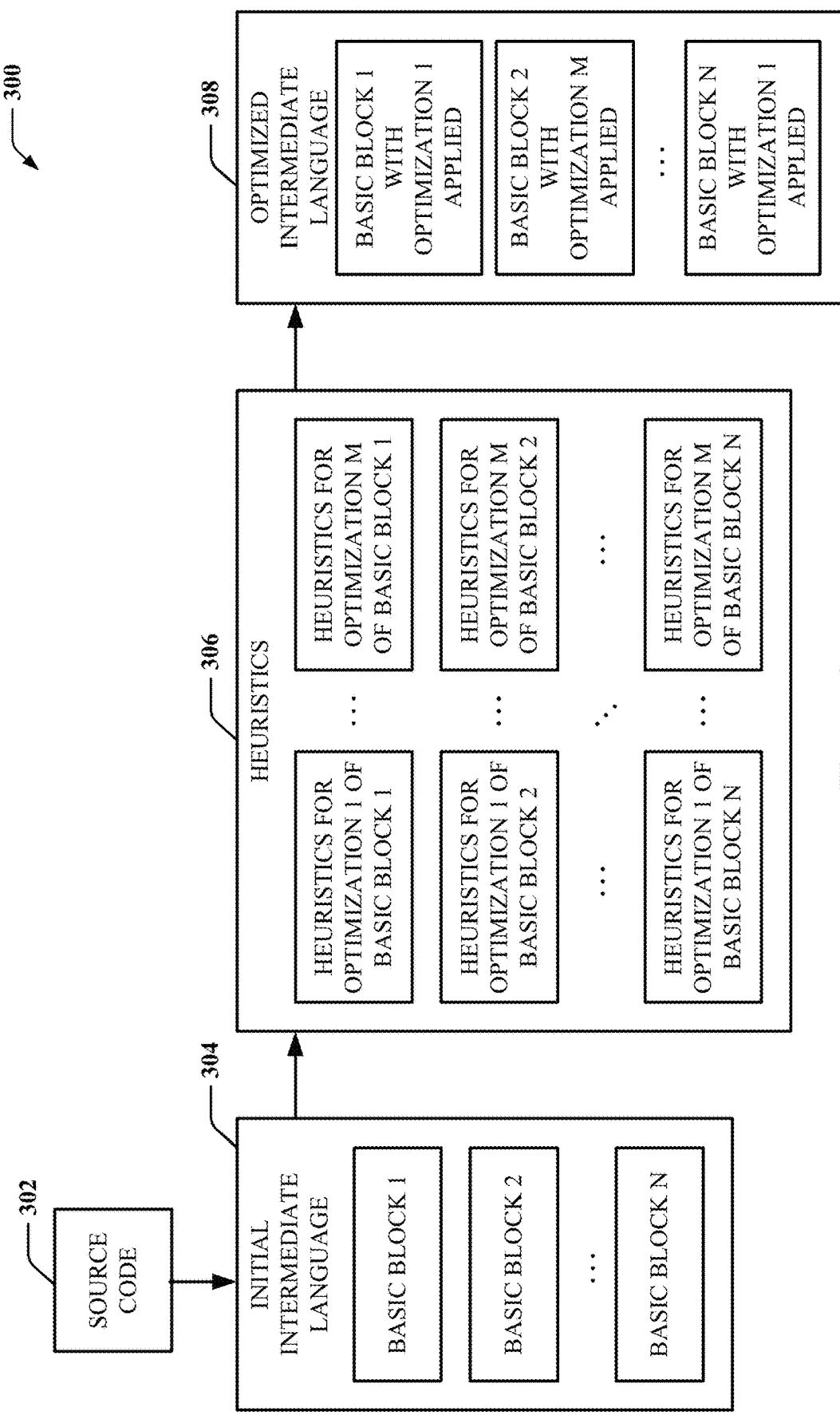
FIG. 3 is a flow diagram of a process for optimizing basic blocks in intermediate language in accordance with examples described herein.

FIG. 3 illustrates an example of a process flow 300 of compiling source code 302 to optimized intermediate language 308 in accordance with aspects described herein. In an example, source code 302 can be compiled into an initial intermediate language 304, as described, including multiple basic blocks (e.g., basic block 1, basic block 2, . . . , basic block n). As described herein, a plurality of heuristics 306 can include for applying possible optimizations to each basic block. As shown, the heuristics may include heuristics for optimization 1 of basic block 1, heuristics for optimization 2 of basic block 1, . . . heuristics for optimization m of basic block 1, . . . heuristics for optimization 1 of basic block n, heuristics for optimization 2 of basic block n, . . . heuristics for optimization m of basic block n, for substantially any value of n and m. With all of the heuristics for each optimization of each basic block are determined, a combination of optimizations to apply for to the basic blocks (e.g., one optimization for each basic block) can be determined, and as described in one example this determination can be based on an overall optimization goal for the software application. In one example, the heuristics can be summed and it can be determined which combination of summed optimization metrics results in a lowest desired optimization metric for the entire collection of n basic blocks. These optimizations can then be applied to corresponding basic blocks to generate the optimized intermediate language 308. In the displayed example, the optimized intermediate language 308 can include basic block 1 having optimization 1 applied, basic block 2 having optimization m applied, . . . basic block n having optimization 1 applied.

Figure 4:
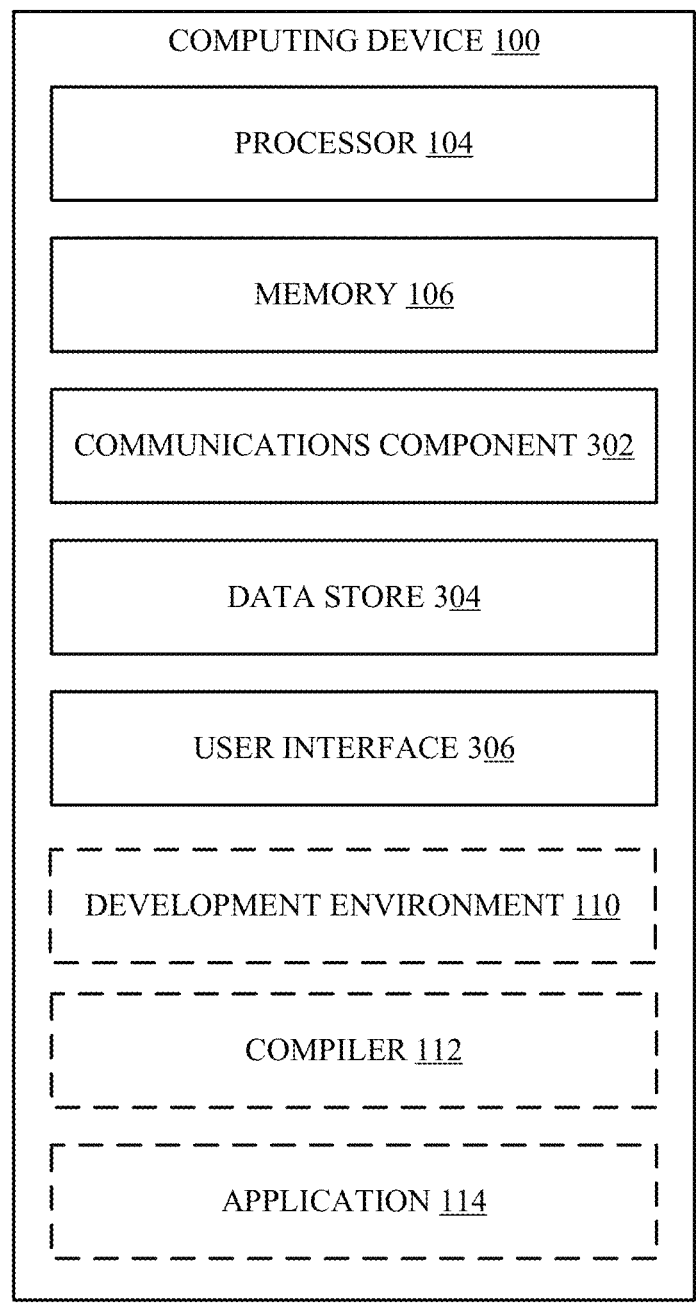
FIG. 4 is a schematic diagram of an example of a computing device for performing functions described herein.

FIG. 4 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as development environment 110, compiler 112, application 114, and/or components thereof, as described herein, and/or other components of the computing device 100.

Further, computing device 100 may include a communications component 402 that provides for establishing and maintaining communications with one or more other devices, parties, entities, etc. utilizing hardware, software, and services as described herein. Communications component 402 may carry communications between components on computing device 100, as well as between computing device 100 and external devices, such as devices located across a communications network and/or devices serially or locally connected to computing device 100. For example, communications component 402 may include one or more buses, and may further include transmit chain components and receive chain components associated with a wireless or wired transmitter and receiver, respectively, operable for interfacing with external devices. For example, communications component 402 can carry communications between development environment 110, compiler 112, application 114 executing on another device (or the same device), etc., as described in various examples herein.

Additionally, computing device 100 may include a data store 404, which can be any suitable combination of hardware and/or software, that provides for mass storage of information, databases, and programs employed in connection with examples described herein. For example, data store 404 may be or may include a data repository for applications and/or related parameters not currently being executed by processor 104. In addition, data store 404 may be a data repository for an operating system, application, such as development environment 110, compiler 112, application 114, and/or components thereof, etc. executing on the processor 104, and/or one or more other components of the computing device 100.

Computing device 100 may also include a user interface component 406 operable to receive inputs from a user of computing device 100 and further operable to generate outputs for presentation to the user (e.g., via a display interface to a display device). User interface component 406 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 406 may include one or more output devices, including but not limited to a display interface, a speaker, a haptic feedback mechanism, a printer, any other mechanism capable of presenting an output to a user, or any combination thereof.

Computing device 100 can also include development environment 110 for providing one or more interfaces for developing application source code, compiler 112 for compiling the source code to machine code for executing on the computing device 100 or other devices, and/or application 114, which can be a software representation of the compiled source code that can execute on the computing device 100 or sent to another device or media for execution thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for scheduling instructions in compiling source code, comprising:
    generating, from a listing of source code, a plurality of basic blocks for compiling into intermediate language;
    determining, for a first basic block of the plurality of basic blocks, first heuristics related to applying a first plurality of optimizations to the first basic block;
    determining, for a second basic block of the plurality of basic blocks, second heuristics related to applying a second plurality of optimizations to the second basic block; and
    applying, based on the first heuristics and the second heuristics, one of the first plurality of optimizations to the first basic block to schedule first instructions for the first basic block and one of the second plurality of optimizations to the second basic block to schedule second instructions for the second basic block, wherein applying comprises:
    selecting the one of the first plurality of optimizations for the first basic block to achieve an overall optimization based on the first heuristics and the second heuristics; and
    selecting the one of the second plurality of optimizations for the second basic block to achieve the overall optimization based on the first heuristics and the second heuristics.

2. The computer-implemented method of claim 1, wherein the first plurality of optimizations is the same as the second plurality of optimizations.

3. The computer-implemented method of claim 1, wherein the first plurality of optimizations includes at least one of minimizing register pressure, minimizing program size, or minimizing memory latency.

4. The computer-implemented method of claim 1, wherein the first heuristics each correspond to estimated optimization metrics for a given one of the first plurality of optimizations, and wherein the second heuristics each correspond to estimated optimization metrics for a given one of the second plurality of optimizations.

5. The computer-implemented method of claim 1, wherein the applying comprises selecting the one of the first plurality of optimizations as a different optimization than the one of the second plurality of optimizations.

6. The computer-implemented method of claim 1, wherein the overall optimization is determined for at least a portion of the listing of source code.

7. The computer-implemented method of claim 1, further comprising generating the intermediate language including the first instructions for the first basic block and the second instructions for the second basic block.

8. A computing device for scheduling instructions in compiling source code, comprising:
    a memory storing one or more parameters or instructions for compiling source code; and
    at least one processor coupled to the memory, wherein the at least one processor is configured to:
        generate, from a listing of source code, a plurality of basic blocks for compiling into intermediate language;
        determine, for a first basic block of the plurality of basic blocks, first heuristics related to applying a first plurality of optimizations to the first basic block;
        determine, for a second basic block of the plurality of basic blocks, second heuristics related to applying a second plurality of optimizations to the second basic block; and
        apply, based on the first heuristics and the second heuristics, one of the first plurality of optimizations to the first basic block to schedule first instructions for the first basic block and one of the second plurality of optimizations to the second basic block to schedule second instructions for the second basic block, wherein applying comprises:

selecting the one of the first plurality of optimizations for the first basic block to achieve an overall optimization based on the first heuristics and the second heuristics; and selecting the one of the second plurality of optimizations for the second basic block to achieve the overall optimization based on the first heuristics and the second heuristics.

9. The computing device of claim 8, wherein the first plurality of optimizations is the same as the second plurality of optimizations.

10. The computing device of claim 8, wherein the first plurality of optimizations includes at least one of minimizing register pressure, minimizing program size, or minimizing memory latency.

11. The computing device of claim 8, wherein the first heuristics each correspond to estimated optimization metrics for a given one of the first plurality of optimizations, and wherein the second heuristics each correspond to estimated optimization metrics for a given one of the second plurality of optimizations.

12. The computing device of claim 8, wherein the at least one processor is configured to select the one of the first plurality of optimizations as a different optimization than the one of the second plurality of optimizations.

13. The computing device of claim 8, wherein the at least one processor is further configured to determine the overall optimization for at least a portion of the listing of source code.

14. The computing device of claim 8, wherein the at least one processor is further configured to generate the intermediate language including the first instructions for the first basic block and the second instructions for the second basic block.

15. A non-transitory computer-readable medium, comprising code executable by one or more processors for scheduling instructions in compiling source code, the code comprising code for:

generating, from a listing of source code, a plurality of basic blocks for compiling into intermediate language;

determining, for a first basic block of the plurality of basic blocks, first heuristics related to applying a first plurality of optimizations to the first basic block;

determining, for a second basic block of the plurality of basic blocks, second heuristics related to applying a second plurality of optimizations to the second basic block; and applying, based on the first heuristics and the second heuristics, one of the first plurality of optimizations to the first basic block to schedule first instructions for the first basic block and one of the second plurality of optimizations to the second basic block to schedule second instructions for the second basic block, wherein applying comprises:

selecting the one of the first plurality of optimizations for the first basic block to achieve an overall optimization based on the first heuristics and the second heuristics; and selecting the one of the second plurality of optimizations for the second basic block to achieve the overall optimization based on the first heuristics and the second heuristics.

16. The non-transitory computer-readable medium of claim 15, wherein the first plurality of optimizations is the same as the second plurality of optimizations.

17. The non-transitory computer-readable medium of claim 15, wherein the first plurality of optimizations includes at least one of minimizing register pressure, minimizing program size, or minimizing memory latency.

18. The non-transitory computer-readable medium of claim 15, wherein the first heuristics each correspond to estimated optimization metrics for a given one of the first plurality of optimizations, and wherein the second heuristics each correspond to estimated optimization metrics for a given one of the second plurality of optimizations.

19. The non-transitory computer-readable medium of claim 15, wherein the code for applying selects the one of the first plurality of optimizations as a different optimization than the one of the second plurality of optimizations.

20. The non-transitory computer-readable medium of claim 15, wherein the code for applying selects the one of the first plurality of optimizations and the one of the second plurality of optimizations based on an optimization goal determined for the listing of source code.

* * * * *